US012692830B2

(12) United States Patent
Yamada et al.

(10) Patent No.: US 12,692,830 B2
(45) Date of Patent: Jul. 28, 2026

(54) FUEL VAPOR PROCESSING DEVICE AND COMPONENT UNIT

(71) Applicant: SUZUKI MOTOR CORPORATION, Hamamatsu (JP)

(72) Inventors: Shinichi Yamada, Hamamatsu (JP); Akihito Fukui, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/952,491

(22) Filed: Nov. 19, 2024

(65) Prior Publication Data

US 2025/0188896 A1 Jun. 12, 2025

(30) Foreign Application Priority Data

Dec. 11, 2023 (JP) ................................ 2023-208127

(51) Int. Cl.
*F02M 25/08* (2006.01)

(52) U.S. Cl.
CPC .... *F02M 25/0836* (2013.01); *F02M 25/0854* (2013.01); *F02M 25/089* (2013.01)

(58) Field of Classification Search
CPC ............... F02M 25/08; F02M 25/0836; F02M 25/0854; F02M 25/089; F02M 35/10209; F02M 35/10222; F02D 41/003
See application file for complete search history.

(56) References Cited

U.S. PATENT DOCUMENTS

| | | | | |
|---|---|---|---|---|
| 10,550,799 B2 * | 2/2020 | Wyatt | ................ | F02M 25/0836 |
| 11,428,178 B2 * | 8/2022 | Yano | ................... | F02D 41/0035 |
| 2006/0243246 A1 * | 11/2006 | Yokoi | ..................... | F02D 9/109<br>123/399 |

FOREIGN PATENT DOCUMENTS

| | | | | |
|---|---|---|---|---|
| EP | 2597020 A1 * | 5/2013 | ............. | B62J 37/00 |
| JP | 5841032 B2 | 1/2016 | | |

* cited by examiner

*Primary Examiner* — Grant Moubry
(74) *Attorney, Agent, or Firm* — Stein IP, LLC

(57) ABSTRACT

A fuel vapor processing device for a straddle-type vehicle equipped with an engine and a fuel tank. The fuel vapor processing device includes: a canister configured to adsorb fuel vapor generated in the fuel tank; an intake system component configured to form a part of an intake passage of the engine; a purge valve configured to release the fuel vapor toward the intake passage; a first hose configured to connect the canister and the purge valve; and a second hose configured to connect the purge valve and the intake system component. The purge valve is attached to the intake system component.

6 Claims, 6 Drawing Sheets

FUEL VAPOR PROCESSING DEVICE AND COMPONENT UNIT

CROSS-REFERENCE TO RELATED APPLICATION(S)

This application is based on and claims priority under 35 USC 119 from Japanese Patent Application No. 2023-208127 filed on Dec. 11, 2023, the entire content of which is incorporated herein by reference.

TECHNICAL FIELD

The present invention relates to a fuel vapor processing device and a component unit.

BACKGROUND ART

Due to regulations regarding fuel vapor, straddle-type vehicles are provided with a fuel vapor processing device that adsorbs fuel vapor generated in a fuel tank using a canister and sends the adsorbed fuel vapor to the engine. As this type of the fuel vapor processing device, there is known one in which a canister and a purge valve are separately attached to a vehicle frame (see, for example, Patent Literature 1). The canister is disposed on the frame at a rear side of the vehicle, and the purge valve is disposed on the frame at a front side of the vehicle. A fuel tank and the canister, the canister and the purge valve, and the purge valve and an intake pipe are connected to each other via a hose.

CITATION LIST

Patent Literature

Patent Literature 1: JP5841032B

When assembling the fuel vapor processing device described in Patent Literature 1, after the canister and the purge valve are attached to the vehicle frame, the canister, the purge valve, and the intake pipe must be connected with hoses. Since the connection work is carried out in a narrow space, work efficiency is reduced and there is a risk of the hose becoming crushed, resulting in a loss of functionality. Especially, an area around the intake pipe behind an engine is surrounded by the frame and the space is narrow, making it difficult to connect the hose extending from the purge valve to the intake pipe.

SUMMARY

The present invention has been made in consideration of the above-mentioned points, and has an object to provide a fuel vapor processing device and a component unit that can improve ease of assembly of a hose between a purge valve and an intake system component.

The above-mentioned problem is solved by a fuel vapor processing device according to one aspect of the present invention, the fuel vapor processing device being a fuel vapor processing device for a straddle-type vehicle equipped with an engine and a fuel tank, the fuel vapor processing device including a canister configured to adsorb fuel vapor generated in the fuel tank, an intake system component configured to form a part of an intake passage of the engine, a purge valve configured to release the fuel vapor toward the intake passage, a first hose configured to connect the canister and the purge valve, and a second hose configured to connect the purge valve and the intake system component, in which the purge valve is attached to the intake system component.

According to the fuel vapor processing device of one aspect of the present invention, the intake system component, the purge valve, and the second hose can be sub-assembled together and then assembled to the engine. There is no need to connect the second hose to the intake system component or the purge valve in a narrow space, and the ease of assembly of the second hose between the purge valve and the intake system component can be improved. Assembly errors such as crushing or contact with other components of the hose are also reduced, thereby improving functionality.

DESCRIPTION OF EMBODIMENTS

A fuel vapor processing device according to one aspect of the present invention is provided in a straddle-type vehicle equipped with an engine and a fuel tank. A part of an intake passage of the engine is formed in an intake system component, and fuel vapor generated in the fuel tank is adsorbed by a canister and the fuel vapor is released from a purge valve toward the intake passage. The canister and the purge valve are connected by a first hose, the purge valve and the intake system component are connected by a second hose, and the purge valve is attached to the intake system component. Therefore, the intake system component, the purge valve, and the second hose can be sub-assembled together and then assembled to the engine. There is no need to connect the second hose to the intake system component or the purge valve in a narrow space, and ease of assembly of the second hose between the purge valve and the intake system component can be improved. Assembly errors such as crushing or contact with other components of the hose are also reduced, thereby improving functionality.

Embodiment

Figure 1:
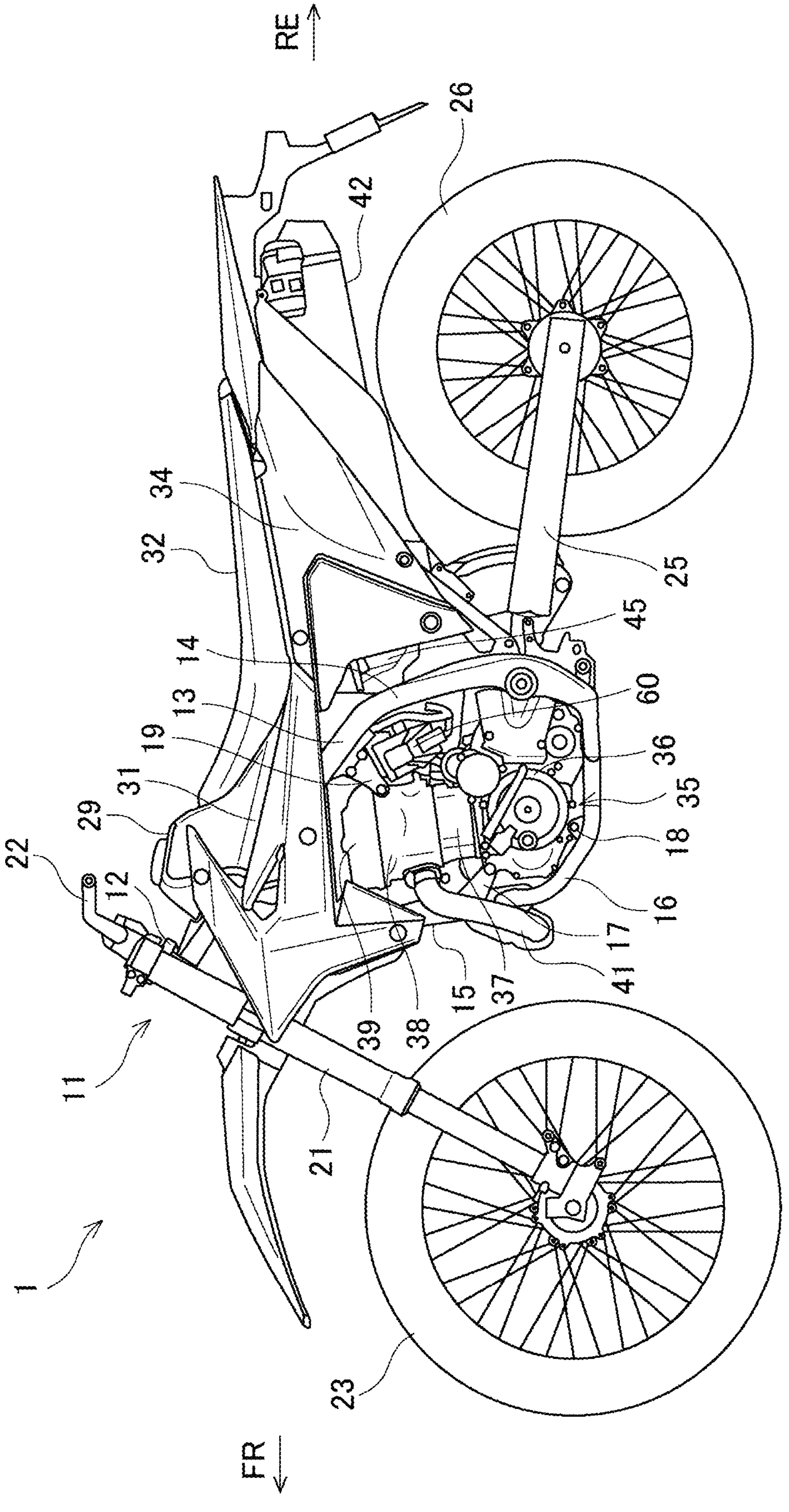
FIG. 1 is a left side view of a straddle-type vehicle according to the present embodiment.

A straddle-type vehicle provided with a fuel vapor processing device according to the present embodiment will be described below with reference to the accompanying drawings. FIG. 1 is a left side view of the straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is implemented by mounting various components such as an engine 35 and an electrical system on a vehicle frame 11. A pair of main frames 13 extend obliquely rearward and downward from a head pipe 12 of the vehicle frame 11, and rear portions of the pair of main frames 13 form a pair of body frames 14 bent downward. A down frame 15 extends downward from the head pipe 12, and a pair of under frames 16 bent rearward are connected to a lower portion of the down frame 15. Rear ends of the pair of under frames 16 are connected to lower portions of the pair of body frames 14, so that the vehicle frame 11 is formed into a cradle shape.

A front fork 21 is steerably supported by the head pipe 12 via a steering shaft (not shown). A handle 22 is provided at an upper portion of the front fork 21, and a front wheel 23 is rotatably supported by a lower portion of the front fork 21. A fuel tank 29 is placed over upper portions of the pair of main frames 13, and the main frames 13 and the fuel tank 29 are laterally covered by a front side cover 31. A seat 32 is disposed behind the fuel tank 29, and a seat frame (not shown) that supports the seat 32 from below is laterally covered by a rear side cover 34.

A swing arm 25 is swingably supported at an intermediate portion of the body frames 14. The swing arm 25 extends rearward from the body frames 14, and a rear wheel 26 is rotatably supported at a rear end of the swing arm 25. The engine 35 is coupled to the rear wheel 26 via a chain drive type transmission mechanism (not shown), and power from the engine 35 is transmitted to the rear wheel 26 via the transmission mechanism. A rear suspension (not shown) is coupled to the swing arm 25, and by expansion and contraction of the rear suspension, unevenness on a road surface is absorbed, so as to prevent vibration and improve a grounding property of the rear wheel 26 with the road surface.

The engine 35 is a four-stroke, single-cylinder engine, and is suspended inside the vehicle frame 11 via suspension brackets 17 to 19. A cylinder assembly in which a cylinder 37, a cylinder head 38, and a cylinder head cover 39 are stacked is attached to an upper portion of a crank case 36 of the engine 35. An intake device, such as an air cleaner 45 and an electronically controlled throttle 60, is provided behind the cylinder head 38. An exhaust pipe 41 is connected to a front surface of the cylinder head 38. The exhaust pipe 41 extends rearward passing through a lateral side of the cylinder 37, and a muffler 42 tilted diagonally upward and rearward is connected to a downstream end of the exhaust pipe 41.

Incidentally, in consideration of regulations on fuel vapor, straddle-type vehicles are equipped with a fuel vapor processing device including a canister and a purge valve. Usually, the canister and the purge valve are attached separately to the vehicle frame. After the canister and the purge valve are attached to the vehicle frame, work of connecting the canister and the purge valve with a hose and work of connecting the purge valve and the throttle with a hose are required, which results in poor work efficiency. It is difficult to ensure a sufficient working space around the engine, and hoses must be connected in a small space, which causes a heavy workload.

Although the workload can be reduced by attaching the canister and the purge valve to a position where the hoses can be easily connected, layout restrictions make it difficult to dispose the canister and the purge valve in a compact manner. Although the canister and the purge valve can be integrated to reduce the workload, the hoses connecting the purge valve to the throttle must be connected in a small space. There is a risk that functionality may be impaired due to the hose being crushed or the like. Therefore, the fuel vapor processing device according to the present embodiment is formed so that it can be assembled to the engine after the throttle, the purge valve, and the hoses are sub-assembled.

Figure 2:
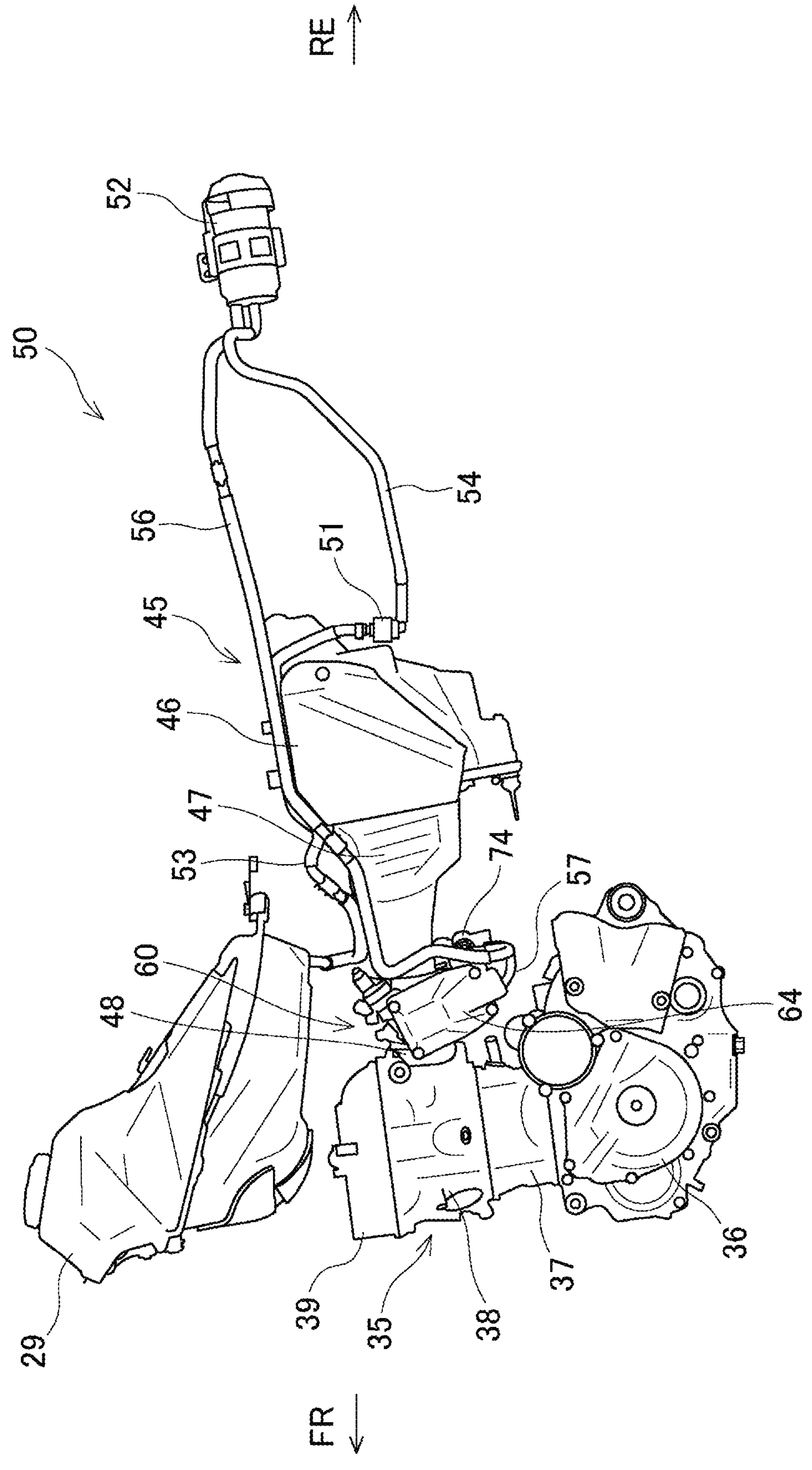
FIG. 2 is a left side view of a fuel vapor processing device of the present embodiment.
Figure 3:
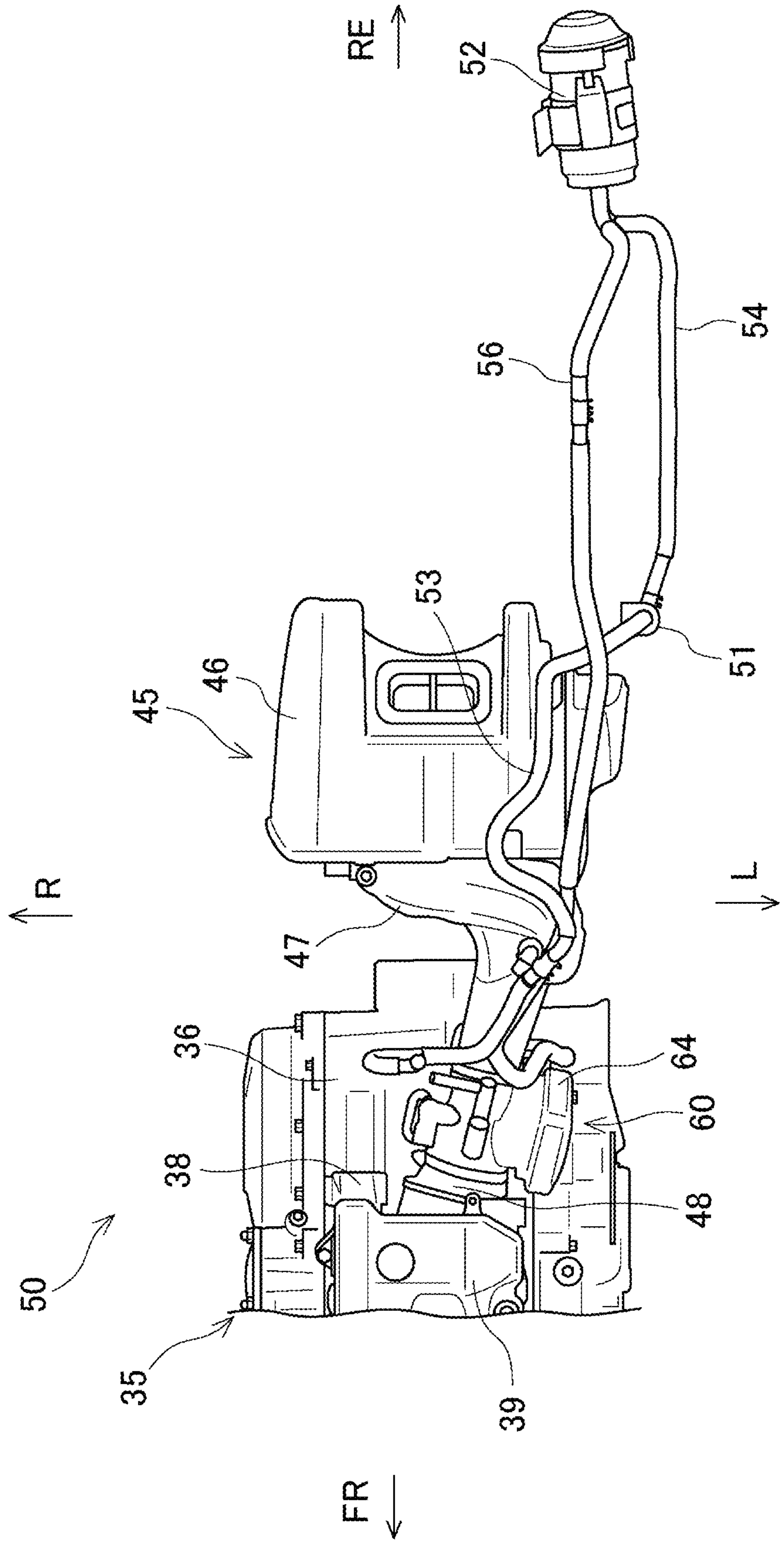
FIG. 3 is a top view of the fuel vapor processing device of the present embodiment.
Figure 4:
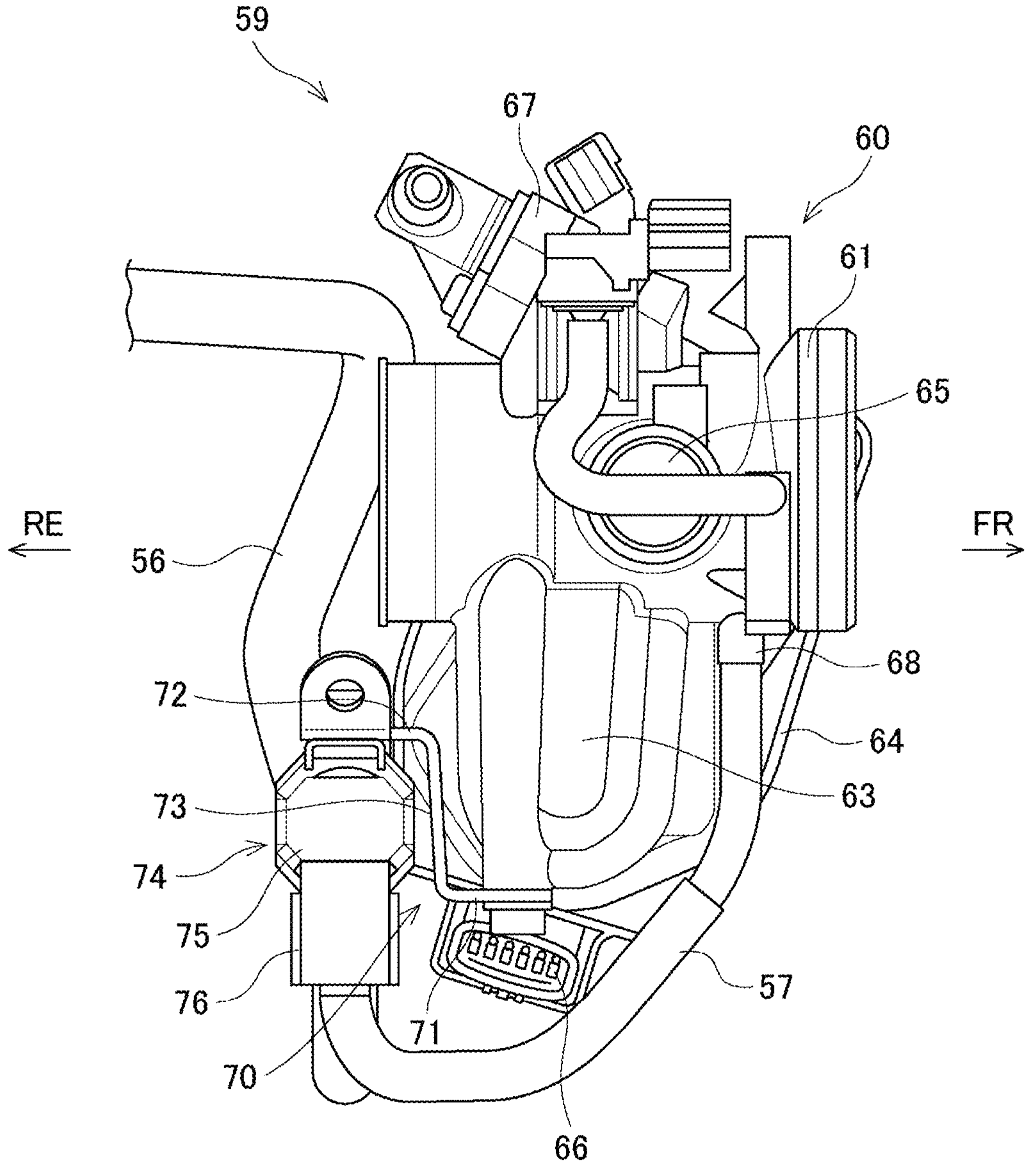
FIG. 4 is a side view of an electronically controlled throttle of the present embodiment.
Figure 5:
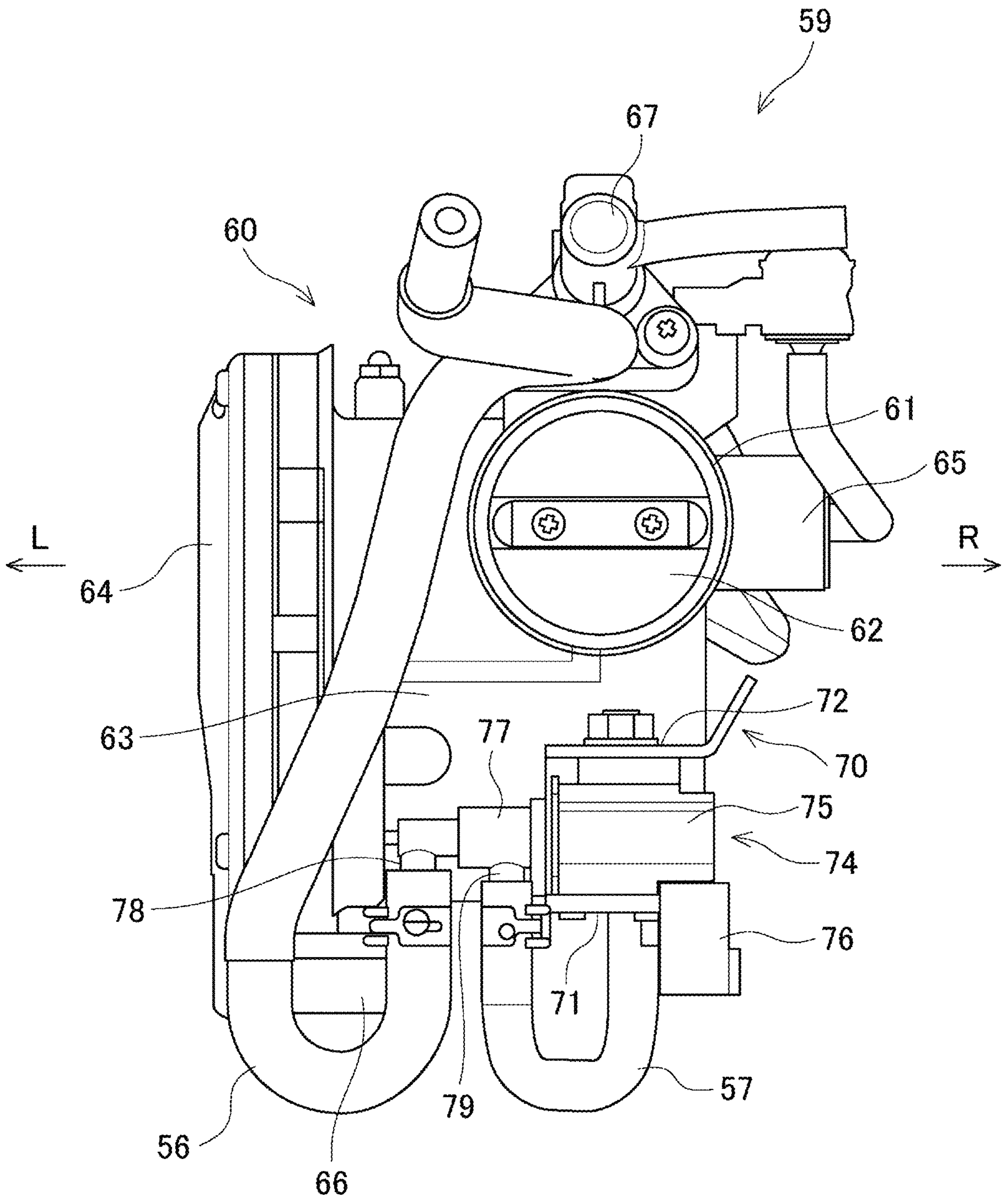
FIG. 5 is a rear view of the electronically controlled throttle of the present embodiment.

The fuel vapor processing device will now be described with reference to FIGS. 2 to 5. FIG. 2 is a left side view of the fuel vapor processing device of the present embodiment. FIG. 3 is a top view of the fuel vapor processing device of the present embodiment. FIG. 4 is a side view of an electronically controlled throttle of the present embodiment. FIG. 5 is a rear view of the electronically controlled throttle of the present embodiment.

As shown in FIGS. 2 and 3, the cylinder 37 is fixed to an upper surface of the crank case 36 of the engine 35, and the cylinder head 38 is fixed to an upper surface of the cylinder 37, and the cylinder head cover 39 is fixed to an upper surface of the cylinder head 38. The air cleaner 45 is provided behind the engine 35. A dirty side of the air cleaner 45 is formed by an air cleaner case 46, and a clean side of the air cleaner 45 is formed by an outlet tube 47. A filter is provided in the air cleaner case 46, and air taken into the air cleaner case 46 is filtered by the filter.

The outlet tube 47 is connected to a front surface of the air cleaner case 46, and a left side of the outlet tube 47 extends diagonally rightward and forward. The outlet tube 47 is connected to the cylinder head 38 via the electronically controlled throttle 60 and an intake pipe 48, and air is supplied from the outlet tube 47 to the cylinder head 38 via the electronically controlled throttle 60 and the intake pipe 48. An intake passage inclined inward in a vehicle width direction toward a downstream side is formed by the outlet tube 47, the electronically controlled throttle 60, and the intake pipe 48. In this way, the electronically controlled throttle 60 forms a part of the intake passage of the engine 35.

The fuel tank 29 is disposed above the cylinder head cover 39. A roll-over valve 51 is provided near a rear portion of the air cleaner 45, and a canister 52 is provided behind the roll-over valve 51 on the seat frame on the right side. The fuel tank 29 and the roll-over valve 51 are connected by a first charge hose 53, and the roll-over valve 51 and the canister 52 are connected by a second charge hose 54. The roll-over valve 51 prevents fuel from leaking from the fuel tank 29 when the vehicle rolls over, and the canister 52 absorbs fuel vapor generated in the fuel tank 29.

The electronically controlled throttle 60 is provided in front of the air cleaner 45, and a purge valve 74 is provided near a rear portion of the electronically controlled throttle 60. A gear case 64 of the electronically controlled throttle 60 is positioned outside the cylinder head 38 in the vehicle width direction. The canister 52 and the purge valve 74 are connected by a first purge hose (first hose) 56, and the purge valve 74 and the electronically controlled throttle 60 are connected by a second purge hose (second hose) 57. By opening and closing the purge valve 74, the fuel vapor is released from the canister 52 and the fuel vapor is discharged toward the intake passage of the electronically controlled throttle 60.

The first charge hose 53 climbs from a lower surface of the fuel tank 29 down onto the outlet tube 47, passes over a right side of the upper surface of the air cleaner 45 and extends rearward, then curves downward at a rear side of the air cleaner 45 and is connected to the roll-over valve 51. The second charge hose 54 extends rearward from the roll-over valve 51 and then rises obliquely upward and rearward to be connected to a front portion of the canister 52. The first and second charge hoses 53, 54 are arranged along the air cleaner 45, making it easy to ensure an arrangement route. The first and second charge hoses 53, 54 form a charge passage for sending the fuel vapor from the fuel tank 29 to the canister 52.

The first purge hose 56 extends forward from a front portion of the canister 52 passing a right side of the upper surface of the air cleaner 45, bends downward behind the electronically controlled throttle 60, and is connected to the purge valve 74. The second purge hose 57 is curved forward in a U-shape from the purge valve 74 and is connected to the intake passage of the electronically controlled throttle 60. The first purge hose 56 is disposed along the air cleaner 45, and the second purge hose 57 passes below the electronically controlled throttle 60, making it easy to ensure the arrangement route. The first and second purge hoses 56, 57 form a purge passage for sending the fuel vapor released from the canister 52 to the intake passage.

The first and second charge hoses 53, 54, the roll-over valve 51, the canister 52, the first and second purge hoses 56, 57, the purge valve 74, and the electronically controlled throttle 60 form a fuel vapor processing device 50. The fuel vapor is sent from the fuel tank 29 to the first charge hose 53, and the fuel vapor introduced from the second charge hose 54 is adsorbed by active carbon or the like in the canister 52. The fuel vapor released from the canister 52 is introduced into the purge valve 74 through the first purge hose 56, and the fuel vapor is released from the purge valve 74 through the second purge hose 57 into the intake passage of the electronically controlled throttle 60.

As shown in FIGS. 4 and 5, the purge valve 74 is attached to the electronically controlled throttle 60 via a bracket 70, and the purge valve 74 and a throttle body 61 are connected by the second purge hose 57 to form a component unit 59. The electronically controlled throttle 60, the purge valve 74, and the second purge hose 57 are sub-assembled, so that the electronically controlled throttle 60, the purge valve 74, and the second purge hose 57 are integrally assembled to the engine 35. By unitizing the electronically controlled throttle 60, the purge valve 74, and the second purge hose 57, the assembly work of the fuel vapor processing device 50 (see FIG. 3) to the straddle-type vehicle 1 is simplified.

An intake passage is formed in the throttle body 61 of the electronically controlled throttle 60, and a throttle valve 62 is disposed in the intake passage of the throttle body 61. A drive motor 63 is connected below the throttle body 61, and the gear case 64 is connected to the left side (one side) of the throttle body 61. The drive motor 63 is formed like a wall that divides a space below the throttle body 61 into front and rear sections, and the gear case 64 is formed like a wall that covers the left side of the throttle body 61. The gear case 64 houses a reduction gear train that transmits a motor driving force to a valve shaft 65 and an electronic substrate for motor control. A connector 66 is provided at a lower portion of the gear case 64, and a control unit (not shown) is connected to the connector 66 via a cable.

An injector 67 is attached to an upper portion of the throttle body 61, and a delivery hose (not shown) is connected to the injector 67. The injector 67 is inclined so as to face diagonally downward and forward, and fuel is injected from the injector 67 toward a downstream of the throttle valve 62. A discharge nipple 68 protrudes downward from the lower portion of the throttle body 61 downstream of the throttle valve 62, and a downstream end of the second purge hose 57 is connected to the discharge nipple 68 of the throttle body 61 from below. The fuel vapor is discharged from second purge hose 57 through a communication passage of discharge nipple 68 toward the downstream of throttle valve 62.

The purge valve 74 is attached to a lower surface of the drive motor 63 via the bracket 70. The bracket 70 is bent in a generally crank shape in a side view, with a lower plate 71 of the bracket 70 positioned forward and an upper plate 72 of the bracket 70 positioned rearward. The lower plate 71 of the bracket 70 is attached to the lower surface of the drive motor 63, an upper surface of the purge valve 74 is attached to the upper plate 72 of the bracket 70, and a side plate 73 is positioned between the drive motor 63 and the purge valve 74. The purge valve 74 is attached in a space behind the drive motor 63 without significantly affecting the structure of the existing electronically controlled throttle 60.

A drive unit 75 of the purge valve 74 is supported from above by the upper plate 72 of the bracket 70. The drive unit 75 is formed in a generally cylindrical shape, and a longitudinal direction of the drive unit 75 is oriented in the vehicle width direction. A connector 76 is provided on a right side (the other side surface side) of a lower surface of the drive unit 75, and a control unit (not shown) is connected to the connector 76 via a cable. A valve case 77 is provided on a left side surface (one side surface) of the drive unit 75, and a valve (not shown) is housed in the valve case 77. The drive unit 75 is implemented by a solenoid, a motor, or the like, and the drive unit 75 drives the valve in the valve case 77 to open and close.

An introduction nipple 78 protrudes downward from a tip of the valve case 77, and a downstream end of the first purge hose 56 is connected to the introduction nipple 78 from below. A sending-out nipple 79 protrudes downward from a base end of the valve case 77, and an upstream end of the second purge hose 57 is connected to the sending-out nipple 79 from below. The downstream end of the first purge hose 56 and the upstream end of the second purge hose 57 are arranged side by side, and the first and second purge hoses 56, 57 are arranged compactly. The first purge hose 56 is positioned outside the second purge hose 57 in the vehicle width direction, and the workability of connecting the first purge hose 56 to the purge valve 74 is improved.

The upstream end of the second purge hose 57 is connected from below to the sending-out nipple 79 of the purge valve 74 behind the drive motor 63, and the downstream end of the second purge hose 57 is connected from below to the discharge nipple 68 of the throttle body 61 in front of the drive motor 63. The second purge hose 57 is disposed in a U-shape so as to avoid the drive motor 63. Even when the purge valve 74 is disposed in the space behind the drive motor 63, the second purge hose 57 does not interfere with the electronically controlled throttle 60, and a hose length of the second purge hose 57 for connecting the purge valve 74 and the electronically controlled throttle 60 is shortened.

In a rear view, the purge valve 74 overlaps the drive motor 63, and the purge valve 74 is contained within a left-right width of the electronically controlled throttle 60, so that the electronically controlled throttle 60 and the purge valve 74 are compactly arranged in the vehicle width direction. The first purge hose 56 is disposed inside a left side surface of the gear case 64 in the vehicle width direction, and the second purge hose 57 is disposed inside a right side surface of the drive motor 63 in the vehicle width direction. In the rear view, the first and second purge hoses 56, 57 are contained within the left-right width of the electronically controlled throttle 60, and the first and second purge hoses 56, 57 are also compactly arranged.

In a side view, a front end of the purge valve 74 is positioned in front of a rear end of the throttle body 61, and the purge valve 74 is positioned directly below the throttle body 61, so that the electronically controlled throttle 60 and the purge valve 74 are compactly arranged in a front-rear direction. The connector 76 of the purge valve 74 is positioned at approximately the same height as the connector 66 at the lower portion of the gear case 64, so that the electronically controlled throttle 60 and the purge valve 74 are compactly arranged in an upper-lower direction. In this way, the electronically controlled throttle 60, the purge valve 74, and the second purge hose 57 are formed into a compact unit.

Figure 6A:
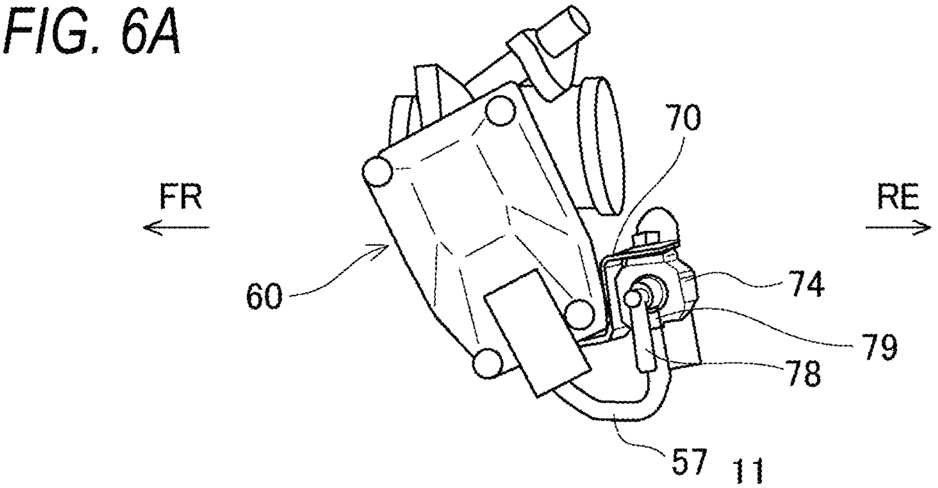
FIGS. 6A to 6C are explanatory diagrams of assembly work of the fuel vapor processing device of the present embodiment.
Figure 6B:
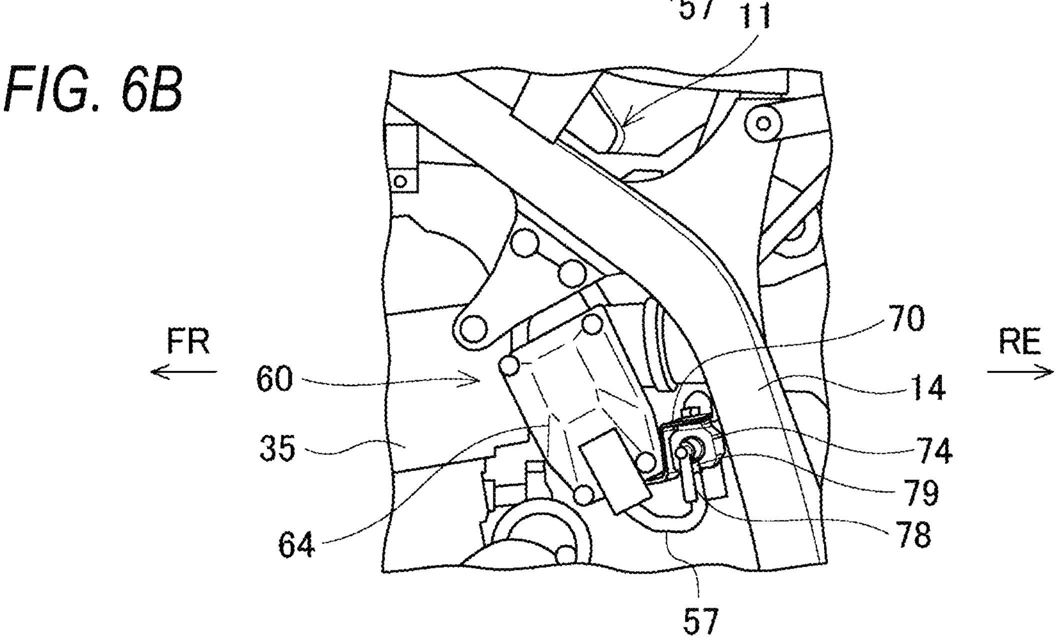
Figure 6C:
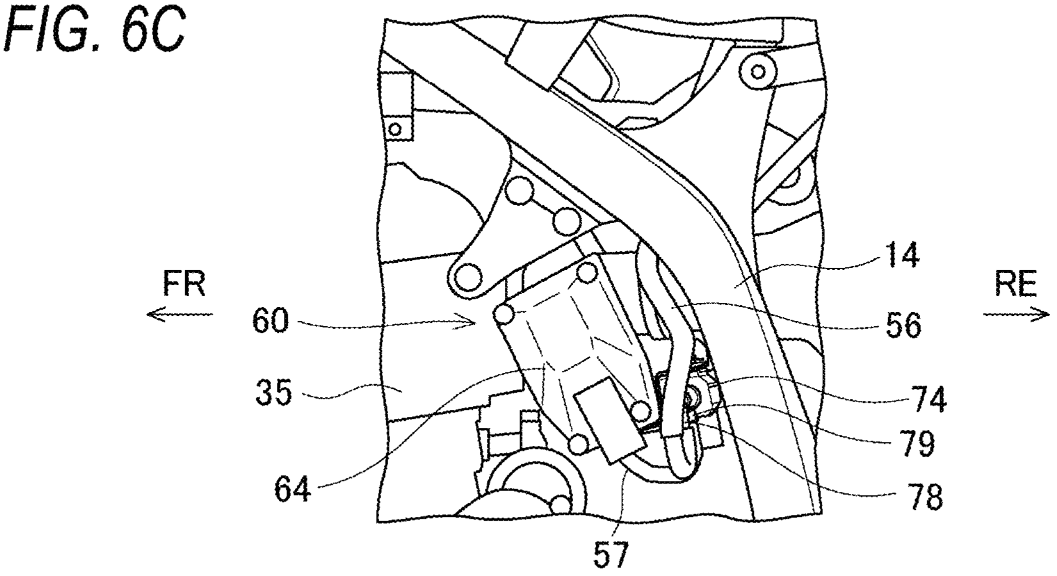

Assembly work of the fuel vapor processing device will be described with reference to FIGS. 6A to 6C. FIGS. 6A to 6C are explanatory diagrams of the assembly work of the fuel vapor processing device of the present embodiment. Note that description of the assembly work of the roll-over valve and the first and second charge hoses will be omitted here.

As shown in FIG. 6A, the electronically controlled throttle 60, the purge valve 74, and the second purge hose 57 are sub-assembled. The purge valve 74 is attached via the bracket 70 to the lower surface of the drive motor 63 (see FIG. 4) of the electronically controlled throttle 60, and both ends of the second purge hose 57 are connected to the sending-out nipple 79 of the purge valve 74 and the discharge nipple 68 (see FIG. 4) of the throttle body 61, respectively. By sub-assembling the electronically controlled throttle 60, the purge valve 74, and the second purge hose 57, a large working space is ensured and the workability of assembling the electronically controlled throttle 60, the purge valve 74, and the second purge hose 57 is improved.

As shown in FIG. 6B, the electronically controlled throttle 60 is attached to the engine 35. As described above, the engine 35 is disposed inside the vehicle frame 11, and the body frame 14 is positioned behind the engine 35. In a side view, a space for disposing the purge valve 74 is ensured in front of the body frame 14, and the purge valve 74 is positioned between the body frame 14 and the gear case 64. Even in a state where the purge valve 74 is attached to the electronically controlled throttle 60, the electronically controlled throttle 60 can be easily attached to and detached from the engine 35 from a lateral side. The canister 52 (see FIG. 2) is attached to a rear portion of the vehicle.

As shown in FIG. 6C, the connection work of the first purge hose 56 is performed. An upstream end of the first purge hose 56 is connected to a nipple on the canister 52 (see FIG. 2) and the downstream end of the first purge hose 56 is connected to the introduction nipple 78 of the purge valve 74. As described above, there is a sufficient gap between the body frame 14 and the gear case 64, making it easy to pass the first purge hose 56 between the body frame 14 and the gear case 64. Since the introduction nipple 78 of the purge valve 74 is positioned outside the sending-out nipple 79 in the vehicle width direction, the first purge hose 56 can be easily connected to the introduction nipple 78 of the purge valve 74.

As described above, according to the fuel vapor processing device 50 of the present embodiment, the electronically controlled throttle 60, the purge valve 74, and the second purge hose 57 can be sub-assembled and then assembled to the engine 35. There is no need to connect the second purge hose 57 to the electronically controlled throttle 60 or the purge valve 74 in a narrow space, and the ease of assembly of the second purge hose 57 between the purge valve 74 and the electronically controlled throttle 60 can be improved. Assembly errors such as crushing or contact with other components of the hose are also reduced, thereby improving functionality.

Note that in the present embodiment, the second purge hose is connected to the electronically controlled throttle, but the second purge hose may be connected to the intake pipe. That is, the intake system component may be an intake pipe instead of an electronically controlled throttle. Especially, in small single-cylinder models, the intake pipe is long, and therefore it is preferable to connect the injector and the second purge hose to the intake pipe.

In the present embodiment, a wire throttle may be used instead of the electronically controlled throttle.

In the present embodiment, the purge valve is attached to the electronically controlled throttle via a bracket, but the purge valve may be attached directly to the electronically controlled throttle.

In the present embodiment, a cradle frame is exemplified as the vehicle frame, but the shape of the vehicle frame is not particularly limited.

In the present embodiment, a single cylinder engine is exemplified, but the type of engine is not particularly limited.

The fuel vapor processing device of the present embodiment is not limited to being applicable to the above-mentioned straddle-type vehicle, but can also be applied to other vehicles such as all terrain vehicles (ATVs) and jet skis. The straddle-type vehicle is not limited to a general vehicle in which a driver rides on a seat in a posture straddling the seat, and includes a scooter-type vehicle in which the driver rides on the seat without straddling the seat.

As described above, a first aspect is a fuel vapor processing device (50) for a straddle-type vehicle (1) equipped with an engine (35) and a fuel tank (29), the fuel vapor processing device including a canister (52) configured to adsorb fuel vapor generated in the fuel tank, an intake system component (electronically controlled throttle 60) configured to form a part of an intake passage of the engine, a purge valve (74) configured to release the fuel vapor toward the intake passage, a first hose (first purge hose 56) configured to connect the canister and the purge valve, and a second hose (second purge hose 57) configured to connect the purge valve and the intake system component, in which the purge valve is attached to the intake system component. According to this configuration, the intake system component, the purge valve, and the second hose can be sub-assembled together and then assembled to the engine. There is no need to connect the second hose to the intake system component or the purge valve in a narrow space, and ease of assembly of the second hose between the purge valve and the intake system component can be improved. Assembly errors such as crushing or contact with other components of the hose are also reduced, thereby improving functionality.

In a second aspect, according to the first aspect, the intake system component is an electronically controlled throttle, the electronically controlled throttle includes a throttle body (61) in which the intake passage is formed and a drive motor (63) connected below the throttle body, and the purge valve overlaps the drive motor in a rear view. According to this configuration, even when the purge valve is attached to the electronically controlled throttle, the electronically controlled throttle and the purge valve can be arranged compactly in the vehicle width direction.

In a third aspect, according to the second aspect, the purge valve is attached to the electronically controlled throttle via a bracket (70), the electronically controlled throttle includes a gear case (64) connected to one lateral side of the throttle body and an injector (67) provided on an upper portion of the throttle body, and the bracket is attached to a lower surface of the drive motor. According to this configuration, the purge valve can be attached by the bracket without significantly affecting the structure of the existing electronically controlled throttle.

In a fourth aspect, according to the second aspect or the third aspect, the purge valve is positioned directly below the throttle body. According to this configuration, even when the purge valve is attached to the electronically controlled throttle, the electronically controlled throttle and the purge valve can be arranged compactly in the front-rear direction. The second hose can also be shortened.

In a fifth aspect, according to any one of the second aspect to the fourth aspect, an upstream end of the second hose is connected from below to the purge valve behind the drive motor, and a downstream end of the second hose is connected from below to the throttle body in front of the drive motor, and the second hose is arranged in a U-shape to avoid the drive motor. According to this configuration, even when the purge valve is disposed behind the drive motor, the hose length of the second hose connecting the purge valve and the electronically controlled throttle is shortened.

In a sixth aspect, according to any one of the first aspect to the fifth aspect, a downstream end of the first hose is connected to the purge valve from below, and the upstream end of the second hose is connected to the purge valve from below, the downstream end of the first hose and the upstream end of the second hose are arranged side by side, and the downstream end of the first hose is positioned outside the upstream end of the second hose in a vehicle width direction. According to this configuration, the first and second hoses can be arranged compactly. Workability of connecting the first hose to the purge valve is improved.

In a seventh aspect, according to any one of the first aspect to the sixth aspect, the engine is disposed inside a vehicle frame (11), and the vehicle frame behind the engine is a body frame (14), and in a side view, a space in front of the body frame for disposing the purge valve is ensured. According to this configuration, even when the purge valve is attached to the electronically controlled throttle, the electronically controlled throttle can be easily attached to and detached from the engine. The first hose can be easily connected to the purge valve.

An eighth aspect is a component unit of a straddle-type vehicle in which fuel vapor generated in a fuel tank is adsorbed by a canister and the fuel vapor is sent from the canister to an engine, the component unit including an intake system component configured to form a part of an intake passage of the engine, a purge valve configured to release the fuel vapor toward the intake passage, and a hose (second purge hose 57) configured to connect the intake system component and the purge valve, in which the purge valve is attached to the intake system component. According to this configuration, the intake system component, the purge valve, and the hose can be sub-assembled together and then assembled to the engine. There is no need to connect the hose to the intake system component or the purge valve in a narrow space, and ease of assembly of the hose between the purge valve and the intake system component can be improved. Assembly errors such as crushing or contact with other components of the hose are also reduced, thereby improving functionality.

Although the present embodiment has been described, as another embodiment, the above-described embodiment and modification may be combined entirely or partially.

The technique according to the present invention is not limited to the above-described embodiment, and may be variously changed, replaced, or modified without departing from the gist of the technical concept. Further, the present invention may be implemented by other methods as long as the technical concept can be implemented by the methods through advance of the technique or other derivative techniques. Therefore, the claims cover all embodiments that may fall within the scope of the technical concept.

The invention claimed is:

1. A fuel vapor processing device for a straddle-type vehicle equipped with an engine and a fuel tank, the fuel vapor processing device comprising:
- a canister configured to adsorb fuel vapor generated in the fuel tank;
- an intake system component configured to form a part of an intake passage of the engine;
- a purge valve configured to release the fuel vapor toward the intake passage;
- a first hose configured to connect the canister and the purge valve; and
- a second hose configured to connect the purge valve and the intake system component, wherein
- the purge valve is attached to the intake system component,
- the intake system component is an electronically controlled throttle,
- the electronically controlled throttle includes a throttle body in which the intake passage is formed and a drive motor connected below the throttle body, and
- the purge valve overlaps the drive motor in a rear view.

2. The fuel vapor processing device according to claim 1, wherein
- the purge valve is attached to the electronically controlled throttle via a bracket,
- the electronically controlled throttle includes a gear case connected to one lateral side of the throttle body and an injector provided on an upper portion of the throttle body, and
- the bracket is attached to a lower surface of the drive motor.

3. The fuel vapor processing device according to claim 1, wherein
- the purge valve is positioned directly below the throttle body.

4. The fuel vapor processing device according to claim 1, wherein
- an upstream end of the second hose is connected from below to the purge valve behind the drive motor, and a downstream end of the second hose is connected from below to the throttle body in front of the drive motor, and
- the second hose is arranged in a U-shape to avoid the drive motor.

5. A fuel vapor processing device for a straddle-type vehicle equipped with an engine and a fuel tank, the fuel vapor processing device comprising:
- a canister configured to adsorb fuel vapor generated in the fuel tank;
- an intake system component configured to form a part of an intake passage of the engine;
- a purge valve configured to release the fuel vapor toward the intake passage;
- a first hose configured to connect the canister and the purge valve; and
- a second hose configured to connect the purge valve and the intake system component, wherein
- the purge valve is attached to the intake system component, a downstream end of the first hose is connected to the purge valve from below, and the upstream end of the second hose is connected to the purge valve from below, the downstream end of the first hose and the upstream end of the second hose are arranged side by side, and the downstream end of the first hose is positioned outside the upstream end of the second hose in a vehicle width direction.

6. The fuel vapor processing device according to claim 1, wherein the engine is disposed inside a vehicle frame, and the vehicle frame behind the engine is a body frame, and in a side view, a space in front of the body frame for disposing the purge valve is ensured.

* * * * *